United States Patent
Giffin (10) Patent No.: US 7,832,545 B2
(45) Date of Patent: Nov. 16, 2010

(54) SYSTEM AND METHOD FOR TRANSFERRING BLANKS IN A PRODUCTION LINE

(75) Inventor: Brian P. Giffin, Shreveport, LA (US)

(73) Assignee: J & L Group International, LLC, Keithville, LA (US)

( * ) Notice: Subject to any disclaimer, the term of this patent is extended or adjusted under 35 U.S.C. 154(b) by 1305 days.

(21) Appl. No.: 10/629,094

(22) Filed: Jul. 29, 2003

(65) Prior Publication Data

US 2004/0245071 A1    Dec. 9, 2004

Related U.S. Application Data

(60) Provisional application No. 60/476,047, filed on Jun. 5, 2003.

(51) Int. Cl.
    *B65G 43/00* (2006.01)
(52) U.S. Cl. .................. 198/460.1; 198/577
(58) Field of Classification Search ............ 198/460.1, 198/577; 271/265.01, 270, 202, 3.2, 176
    See application file for complete search history.

(56) References Cited

U.S. PATENT DOCUMENTS

| | | | | |
|---|---|---|---|---|
| 3,075,630 A | * | 1/1963 | Fisk | 198/460.1 |
| 3,827,545 A | | 8/1974 | Buhayar | |
| 3,992,182 A | * | 11/1976 | Frank | 198/577 |
| 4,360,098 A | * | 11/1982 | Nordstrom | 198/418.1 |
| 4,632,381 A | | 12/1986 | Cuir et al. | |
| 4,724,946 A | * | 2/1988 | Cinotti | 198/419.2 |
| 5,038,915 A | * | 8/1991 | Delsanto | 198/419.3 |
| 5,129,641 A | * | 7/1992 | Long | 198/460.1 |
| 5,341,915 A | * | 8/1994 | Cordia et al. | 198/460.1 |
| 5,685,130 A | * | 11/1997 | Horsman | 53/510 |
| 5,699,651 A | * | 12/1997 | Miller et al. | 53/448 |
| 5,711,410 A | * | 1/1998 | Cai et al. | 198/460.1 |
| 5,762,175 A | * | 6/1998 | Focke et al. | 198/461.2 |

FOREIGN PATENT DOCUMENTS

| | | |
|---|---|---|
| EP | 1 306 336 A2 | 5/2003 |
| WO | WO 92/12079 | 7/1992 |

OTHER PUBLICATIONS

Sound Container Proposal # 4441, J & L Development; (5pgs); Aug. 3, 1999.

* cited by examiner

*Primary Examiner*—Mark A Deuble
(74) *Attorney, Agent, or Firm*—Dority & Whitney LLP (57) ABSTRACT

A system and method for transferring blanks of material passing from a feeder line to a production line along differing conveyor segments. The production line moves at a higher velocity that the feeder line. Just as a blank is about to transfer from the feeder line to the production line, the feeder line is rapidly accelerated to substantially match the velocity of the production line. This assures a smooth, even, and accurate transfer. Near the end of the transfer, the feeder line is decelerated. Thus, the transferred blank is now moving at a higher velocity than the next adjacent blank.

14 Claims, 7 Drawing Sheets

SYSTEM AND METHOD FOR TRANSFERRING BLANKS IN A PRODUCTION LINE

RELATED APPLICATION

This application claims the benefit of Provisional Application Ser. No. 60/476,047, filed Jun. 5, 2003

BACKGROUND OF THE INVENTION

1. Field of the Invention

The present invention relates to conveyance devices. More specifically, the present invention relates to controlling a conveyance device to transfer objects from one conveyor to a second conveyor in an assembly line and still more specifically, the present invention relates to a means for transferring carton blanks from a conveyor at one speed to a conveyor of another speed.

2. Description of the Related Art

Various conveyance devices are commonly used to transport blanks or stock material from a feeder, through an assembly line or process, to an end point where a finished product results. For example, in the production of packaging, cardboard, paperboard or corrugated blanks are moved through a folder/gluer to transform the blank into a completed box. A feeder is provided that receives a store of blanks. The blanks are removed in an automated fashion from the feeder and moved along a belt system, where they are introduced into various modules. Each module completes a specific action. For example, each module might make a specific fold or glue a specific portion.

The transitions from the feeder to the first module is important. That is, the blanks are essentially stored in stacked relationship within the feeder and are rapidly and sequentially transferred to the first module. Thus, there is a tension between providing the blanks as rapidly as the module can process them and accurately feeding them into that module. For example, in some systems any given section of a conveyer includes four belts that are relatively narrow in comparison to the blank: two upper sections generally aligned at or near the edge and two lower sections similarly aligned with the edge. Thus, if a blank enters this section of conveyor askew or if the belts are not running in synchronicity, the blank may be shifted out of its proper orientation. When improperly positioned, the remaining modules may not properly process the blank.

In addition, because many feeders dispense the blanks in an end-to-end relationship with no gap, or minimal gap, between adjacent blanks, and because a gap is necessary for the downstream modules to properly process the blanks, the speed of the downstream module belts (the line speed) is greater than the feeder belt speed.

The fact that the blanks must be transferred from a slower moving feeder belt speed to a faster moving line belt speed creates additional problems. The first is excessive belt wear resulting from one or more belts sliding over a portion of the blank because of the speed differential. The second is the wearing such sliding will produce on the blanks, particularly with respect to printed matter.

Thus, there exists a need to provide properly spaced, appropriately aligned blanks to a processing module while reducing and minimizing belt wear and damage to the blanks.

BRIEF SUMMARY OF THE INVENTION

The present invention, in one embodiment, is a method of delivering blanks to a module, the method comprising dispensing blanks onto a first conveyor traveling at a first velocity; accelerating the first conveyor to substantially match a second velocity of a second conveyor; transferring the blank from the first conveyor to the second conveyor; and reducing the velocity of the first conveyor to the first velocity. This creates a desired gap between adjacent blanks transferred to the second conveyor.

In another embodiment, the present invention is a method of providing blanks into a modular folder/gluer having a plurality of modules interconnected by conveyance mechanisms. The method comprises dispensing blanks from a feeder into a first conveyor having upper and lower belt members to guide and move the blanks, the blanks being dispensed into the first conveyor having a distance between adjacent blanks that is less than an acceptable gap distance for processing within the modules. The method further comprises advancing the blanks from the feeder toward a first module at a first velocity; detecting with a photodetector the position (such as a leading edge) of a given blank as it approaches a second conveyor traveling at a second velocity greater than the first velocity; and accelerating the first conveyor from the first velocity to the second velocity when the photodetector provides a signal indicative of having detected the leading edge (or other position) of the given blank. The method further comprises transferring the blank from the first conveyor to the second conveyor while the given blank is traveling at the second velocity and then decelerating the first conveyor to the first velocity prior to a subsequent blank triggering the photodetector. During this deceleration, the given blank and the subsequent blank travel at different velocities over a time range so that a space or gap is formed between the given blank and the subsequent blank when the given blank and the subsequent blank are on the second conveyor.

In another embodiment, the present invention is an apparatus for folding and gluing blanks into boxes comprising a feeder capable of receiving a plurality of blanks and sequentially dispensing the blanks. The apparatus further comprises a carrier conveyor operably coupled with the feeder and having an upper belt and a lower belt to receive the blanks dispensed from the feeder in an end-to-end relationship, the feeder conveyor operable at a first velocity and second velocity; a servo motor operably coupled with the feeder conveyor to drive the feeder conveyor; and a carrier conveyor positioned proximate the feeder conveyor and having a nip point, the nip point located so that blanks may be fed from the feeder conveyor into the nip point and received by the carrier conveyor where they are conveyed to a first module for processing the blank into a box. The apparatus further comprises a photodetector positioned to detect the position of the blank as the blank is conveyed by the feeder conveyor and approaches the carrier conveyor and a controller operably coupled to the servo motor and the photodetector to increase the feeder conveyor from the first velocity to the second velocity at a specified point during travel of the blank along the feeder conveyor and to decelerate the feeder conveyor after a predetermined period of time has elapsed.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
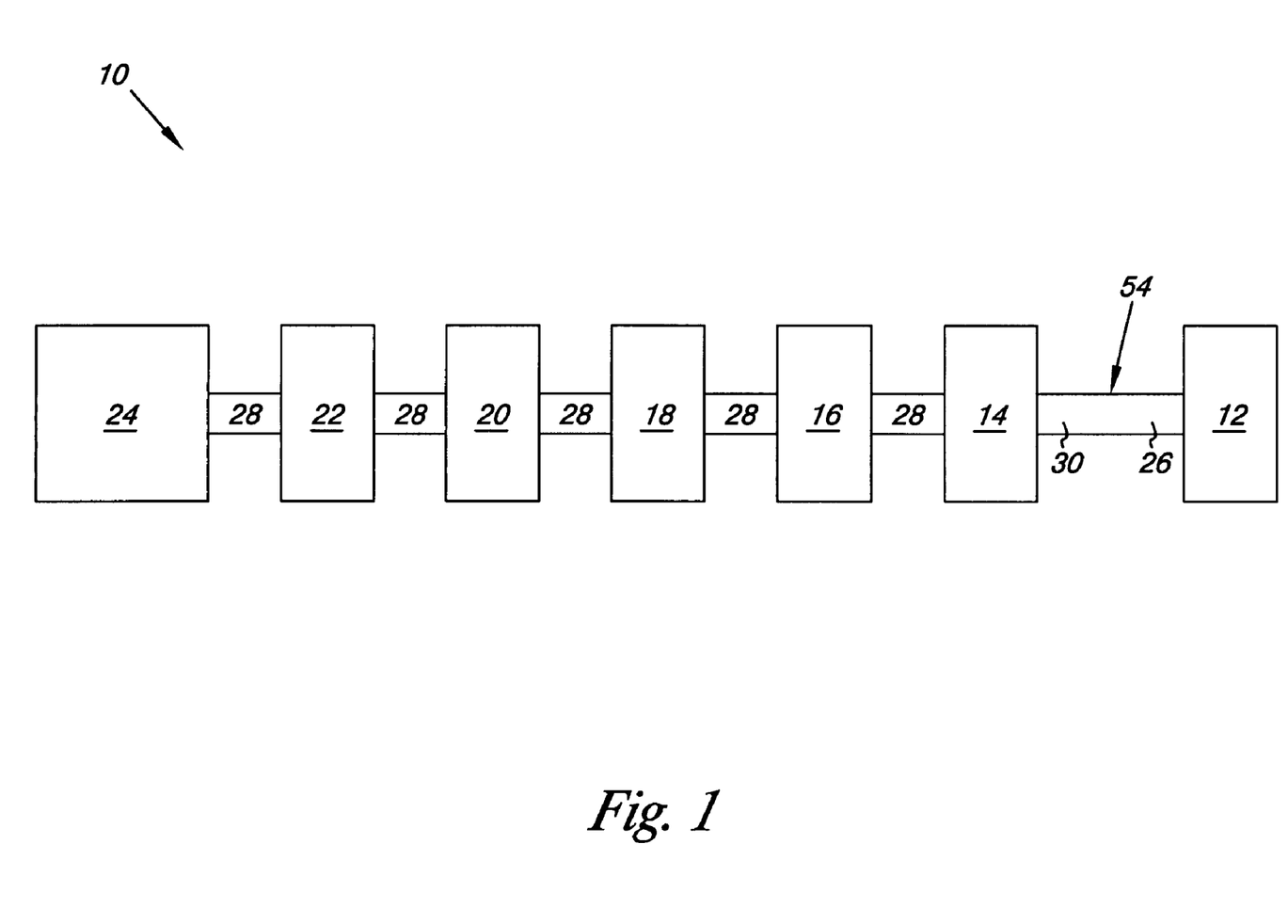
FIG. 1 is a schematic view of a folder/gluer.
Figure 2:
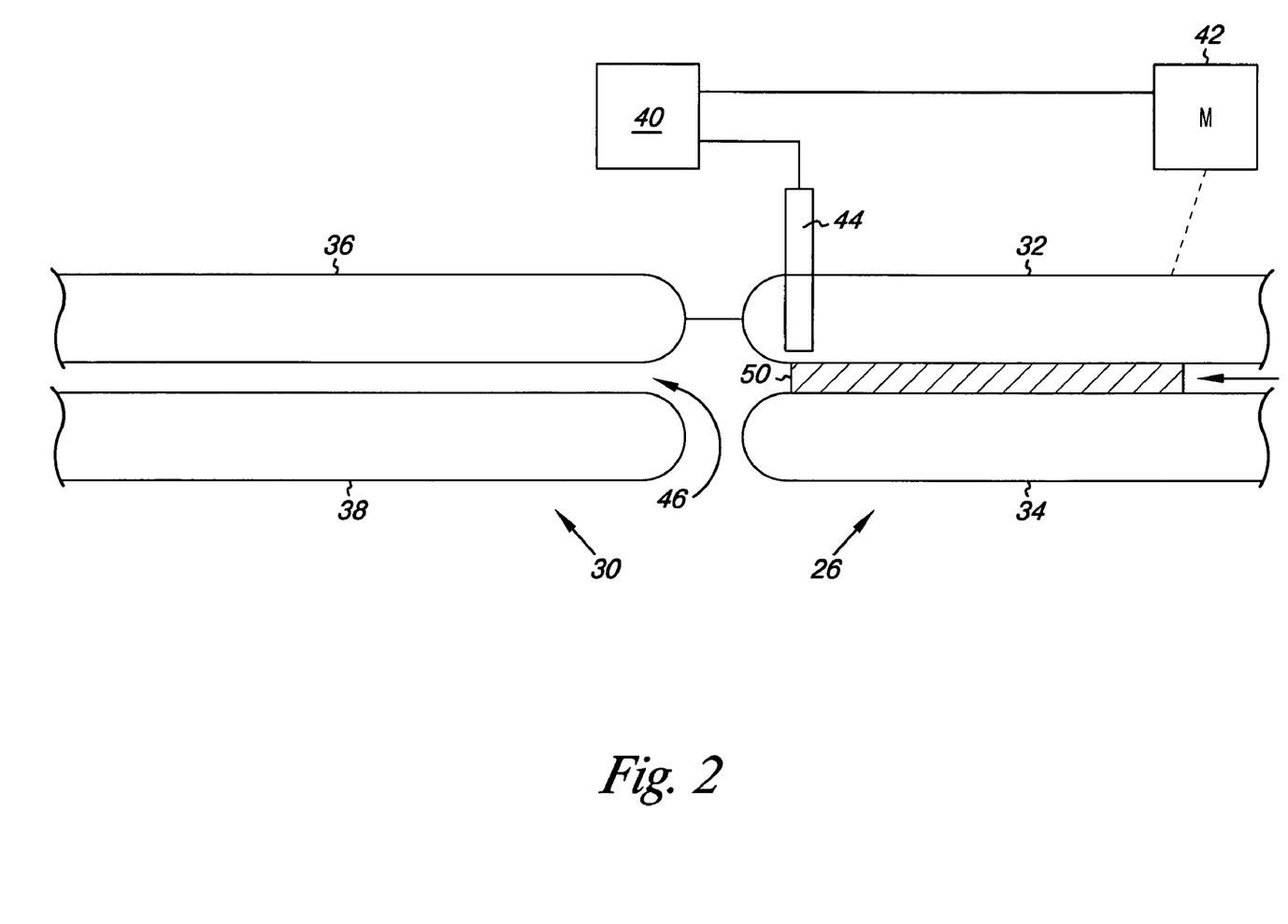
FIG. 2 is a schematic side view of a transfer point between a feeder conveyor and a carrier infeed conveyor.

FIG. 1 is a schematic view illustrating an automated folder/gluer 10 having a plurality of modules. A feeder module or hopper 12 is loaded with a plurality of blanks of a stock material, such as cardboard, that can be processed into boxes or other final products. These blanks may be vertically stacked as is known in the art. Individual blanks are expelled from the feeder module or hopper 12 and carried along a feeder belt 26. As shown in FIG. 2 along with continuing reference to FIG. 1, the blank is passed to a carrier infeed belt 30 at a transfer point 54. The carrier infeed belt 30 conveys the blank into a first backfold module 14. Backfold module 14 folds a specific portion of the blank and then transfers the folded blank to a series of subsequent modules 16, 18, 22, 24. By way of example, this folder/gluer 10 includes a second backfold module 16, a final fold module 20, a delivery module 22 and a compression module 24. Each subsequent module is interconnected by a module belt 28 that facilities the transfer of the blank from one module to the next. Of course, fewer modules or additional modules may be provided for specific applications. Preferably the blanks in any one run are substantially identical.

The folder/gluer 10 is an automated system including an appropriate controller as well as a number of motors and actuators. Once initiated, the folder/gluer 10 processes blanks into completed boxes without requiring additional input during a production run. It should be appreciated that the folder/gluer 10 will normally include a variety of components and controls that will not be described herein.

Figure 3:
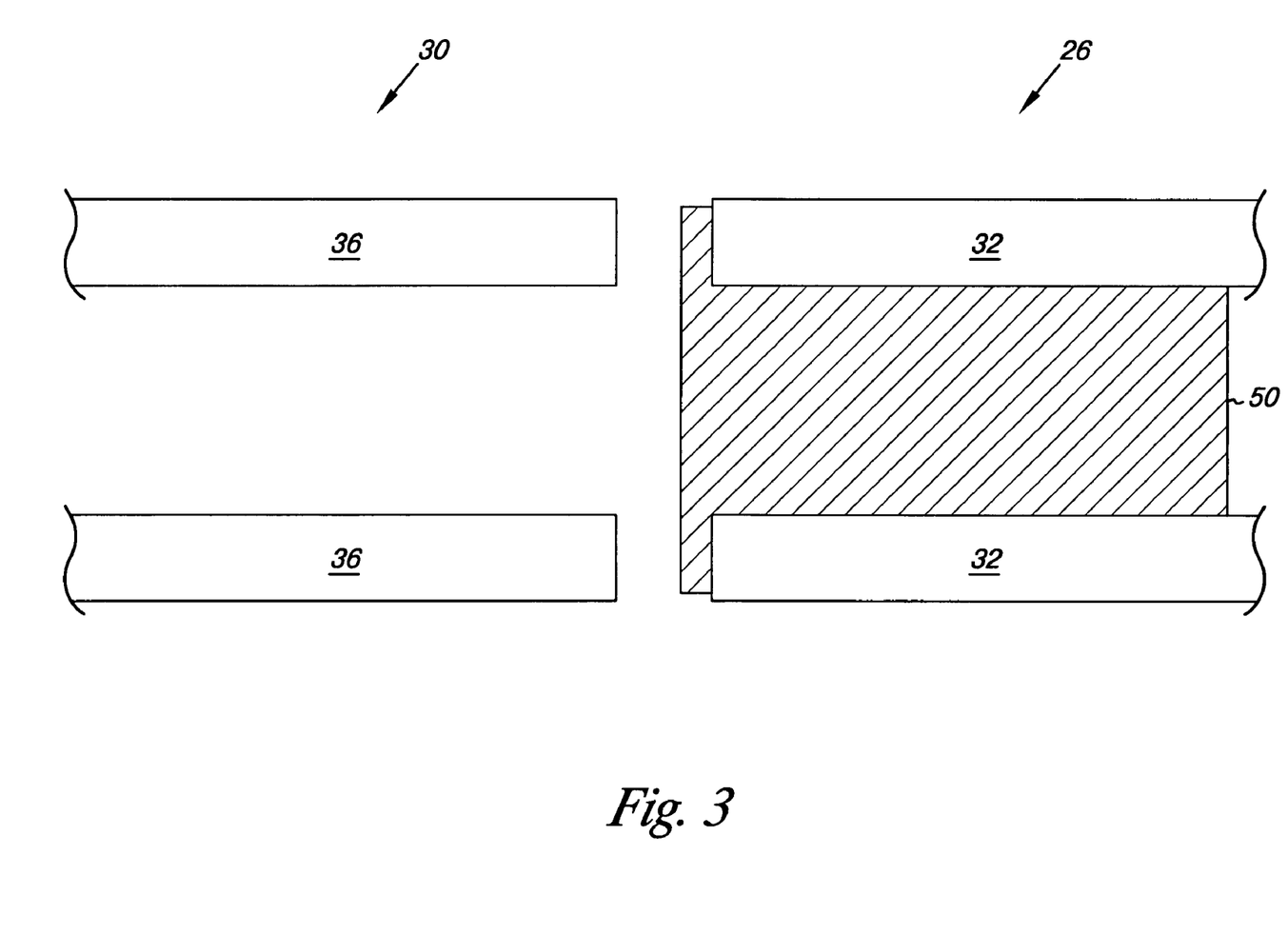
FIG. 3 is a top, planar view of the transfer point of FIG. 2.

FIG. 2 schematically illustrates the transfer point 54 between the feeder belt 26 and the carrier infeed belt 30. In general, a blank 50 is taken from the bottom of the feeder module 12 and transported along the feeder belt 26 toward the carrier infeed belt 30. As illustrated, the blank 50 is contained between an upper set of rollers 32 and a lower set of belts 34. FIG. 3 illustrates a top view of these belts and their relative position with respect to the blank 50.

The blank 50 is moved at a feeder velocity (or speed) (V0) during a portion of the time that it is in the feeder belt 26 and, in general, is transferred to the carrier infeed belt 30 moving at a higher carrier velocity (or speed) (V1). As the blanks 50 travel along and approach the exit of the feeder, they are typically positioned in an end-to-end, adjacent relationship and the ends may even be in contact with one another. Because the carrier infeed belt 30 is moving at a greater speed than the feeder belt 26, it is desirable to transfer the blank from the feeder belt 26 to the infeed belt 30 at the higher speed. To that end, the feeder belt 26 is rapidly accelerated to the carrier speed (V1) just prior to transfer so that the blank 50 is transferred from the feeder belt 26 to the carrier infeed belt 30 when both are at the carrier speed (V1). Then, at the end of the transfer process, the feeder belt speed is reduced to the slower feeder speed (V0). Thus, the blank 50 (having been transferred) is moving at a higher velocity than the next adjacent blank (remaining in the feeder belt 26) for a period of time. This creates or introduces a gap between adjacent blanks 50 once they are transferred.

The actual transfer involves moving the blank 50 out of the feeder belt 26 and into the carrier infeed belt 30. More particularly, a leading edge of the blank 50 is conveyed into a nip point 46 formed as the entrance point between an upper set of carrier infeed belts 36 and a lower set of carrier infeed belts 38. As the blank 50 is received within the nip point 46, the frictional engagement between the belts 36 and 38 and the blank 50 causes the blank to be engaged and subsequently conveyed by the carrier infeed belt 30. Because both the feeder belt 26 and the carrier infeed belt 30 are preferably moving at substantially the same speed during this transfer, misalignment is eliminated or substantially reduced.

As illustrated in the preferred embodiment, there is a space between the photodetector 44 and carrier infeed belt 30. This space can be minimized so that the photodetector 44 and the carrier infeed belt 30 are in close proximity, maximized to almost a full length of a given blank 50, or set anywhere between. This distance will generally be a function of the blank length, the relative speeds of the feeder and carrier belts and the desired gap between blanks in the subsequent modules.

During operation, the feeder belt 26 advances a series of adjacent blanks forward along the feeder belt 26 toward the carrier belt 30 at the feeder speed (V0) until the leading edge of the forwardmost blank 50 is sensed by a photoelectric sensor or photodetector 44. The photodetector 44 initiates a signal that is received by a controller 40 that controls the feeder belt 26. The controller then accelerates a servo motor 42 driving the feeder belt 26 until the higher carrier speed (V1) is achieved. This speed (V1) is maintained for a predetermined period of time. Then controller 40 causes the servo motor 42 to reduce the velocity of the feeder belt 26 back to the feeder speed (V0).

Figure 4A:
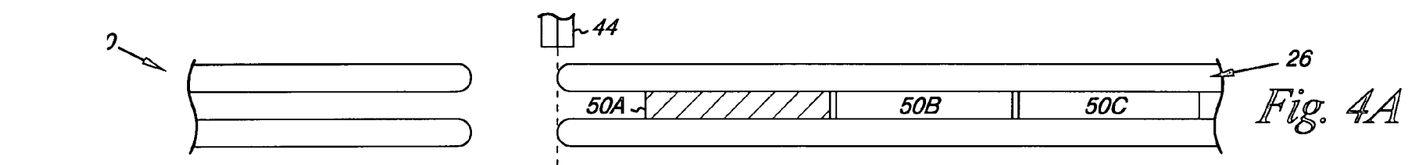
FIGS. 4A-4F are schematic illustrations of a blank transferring from a feeder conveyor to a carrier infeed conveyor.
Figures 4B, 4C, 4D:
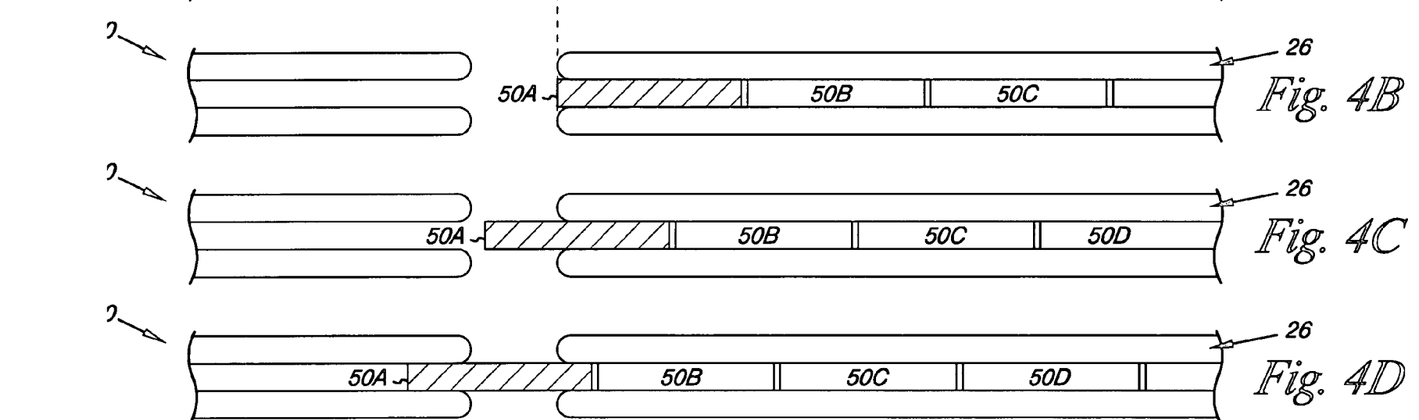

The transfer process is illustrated schematically in FIGS. 4A-4F in reference to a particular blank 50A. In FIG. 4A, blank 50A is moving at the feeder velocity (V0) towards the carrier infeed belt 30. In FIG. 4B, the leading edge of the blank 50A is detected by the photodetector 44. This triggers controller 40 to initiate a command to accelerate the feeder belt 26 to the higher carrier velocity (V1). This acceleration occurs very rapidly, and blanks 50A, 50B, 50C, etc. are all accelerated to this higher velocity (V2). In FIG. 4C, the blank 50A and the blanks 50B, 50C and 50D are moving at the higher velocity (V1) and the blank 50A has partially exited the feeder belt 26. In FIG. 4D, the leading edge of the blank 50A has been received at the nip point 46. Because the blank 50A is moving at the carrier velocity (V1), the entry to the nip point 46 is very smooth and the blank is not skewed in the process.

Figure 4E:
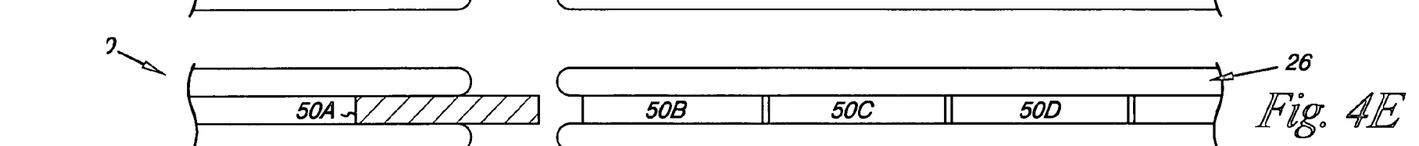

At some point after the leading edge has been received in the nip point, the velocity of the feeder belt 26 is reduced to the feeder velocity (V0). FIG. 4E illustrates the blank 50A as being fully transferred from the feeder belt 26. At this point, blank 50A will be traveling at the higher velocity V1, while the feeder belt 26 and the blanks 50B and 50C are reduced to the lower velocity V0. This creates a space or gap between the two blanks 50A and 50B which continues to increase until the leading edge of blank 50B is detected by the photodetector

Figure 4F:
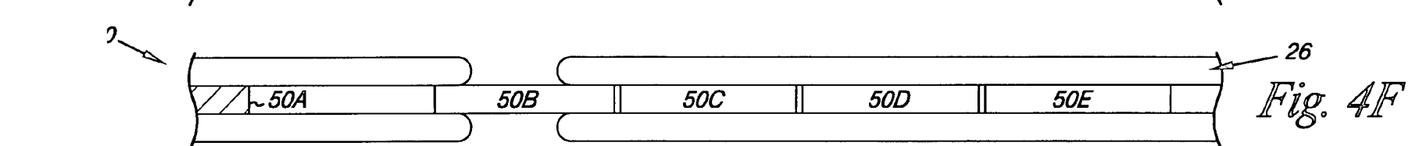

44, thereby repeating the above sequence. FIG. 4F illustrates blank 50B entering the nip point 46 and moving at the same velocity as blank 50A; however, there is already a gap between them that will be maintained during the rest of the process.

In the preferred embodiment and method, the leading edge of given blank will trigger a start signal via the photodetector 44. The time that the feeder belt 26 remains at the higher velocity is predetermined based on variables which are entered at the start of a production run. More specifically, the length of the blank 50 is entered, along with the feeder velocity (V0) and the carrier velocity (V1). From these variables, the controller 40 calculates the appropriate length of time to run the feeder belt 26 at the higher velocity each time a blank 50 triggers the photodetector 44.

Figure 5:
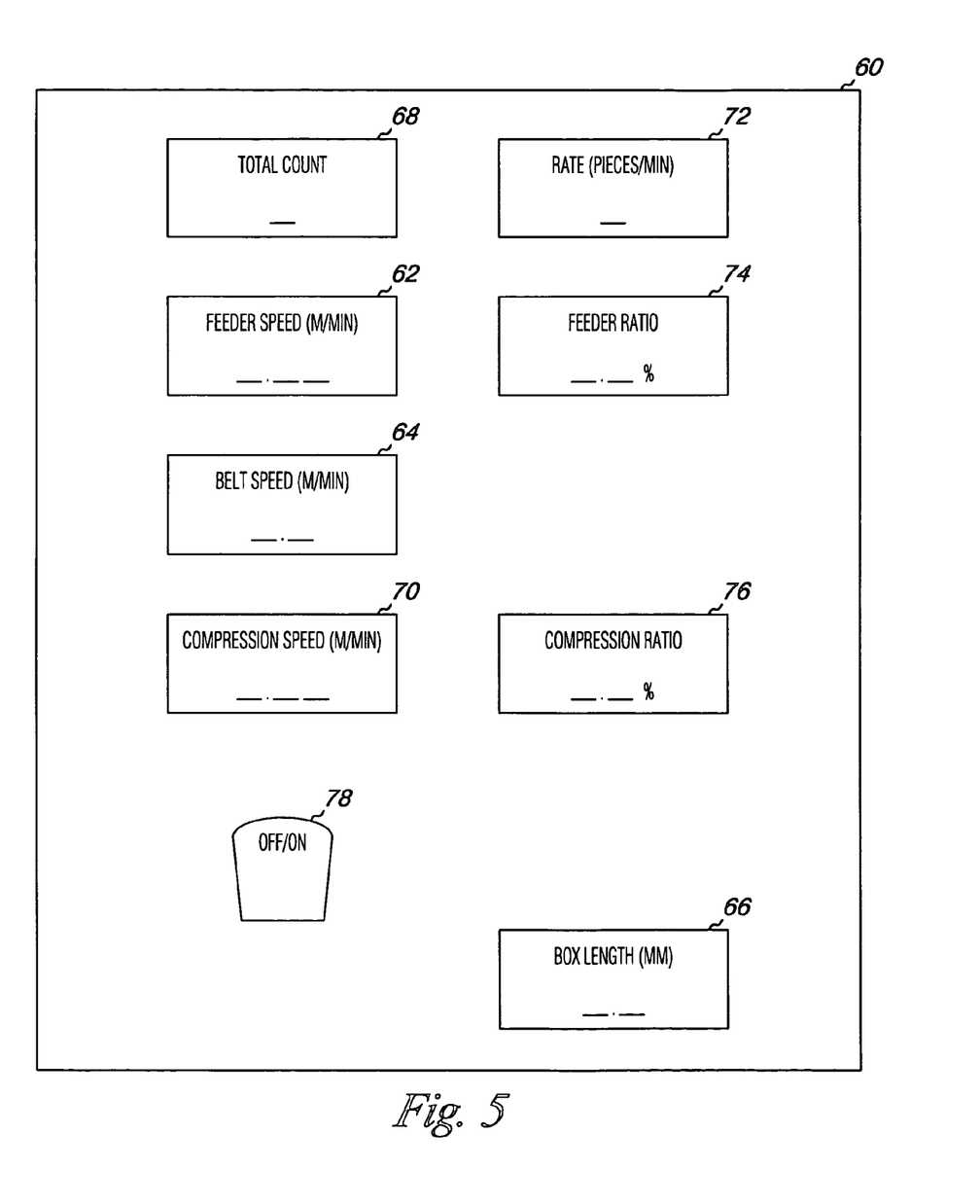
FIG. 5 is a schematic illustration of a user interface.

FIG. 5 illustrates a sample input screen 60 for the controller 40. The operator will enter the feeder velocity 62 in the appropriate units, e.g., meters/minute; the carrier velocity 64 in the appropriate units, e.g., meters/minute and the box length 66 in appropriate units, e.g., millimeters. The controller 44 will monitor and provide a tally of the total box count 68, rate 72, calculated compression speed 70, feeder ratio 74 and compression ratio 76. The operator also may turn the system on and off with system control 78.

When performing the calculations, the algorithm takes into account the non-instantaneous nature of the acceleration and deceleration of the feeder belt 26. Thus, when an operator enters a given blank length, carrier velocity, and feeder velocity, the controller 40 uses this algorithm to determine if the variables are feasible. If they are not, the operator may be alerted or the feeder velocity may be automatically adjusted to compensate.

One algorithm for accomplishing the above is based on setting the acceleration of the feeder belt 26 to a percentage change over a given period of time, e.g., 1 second. This percentage change is referred to as the feeder step rate. A typical percentage change for a given servo motor over such a time period may be, for example, 500%. To determine the time necessary to accelerate from an initial V0 to a final V1:

$$\text{acceleration} = \frac{\text{feeder\_step\_rate}}{1 \text{ sec}} = \frac{\left(1 - \frac{V0}{V1}\right)(100)}{t1 - t0}$$

$$(t1 - t0) = \left(1 - \frac{V0}{V1}\right)\left(\frac{100}{\text{feeder\_step\_rate}}\right)$$

Figure 6:
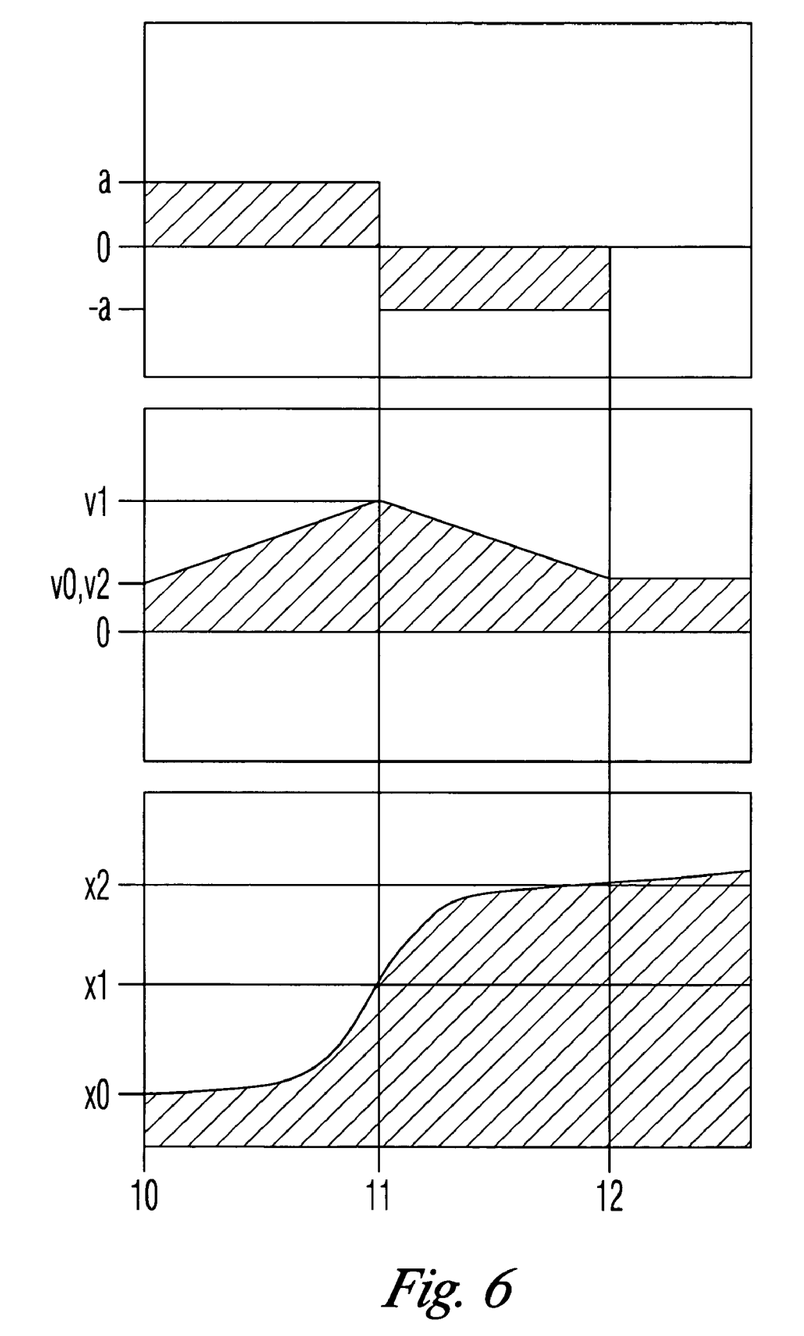
FIG. 6 illustrates acceleration, velocity and position graphs for a feeder conveyor.

To calculate the position (X1) of the feeder belt 26 when the higher velocity is reached, reference is made to the acceleration, velocity and position graphs represented in FIG. 6.

$$X1 = X0 + V0(t1) + 0.5(V1 - V0)(t1)$$

$$X1 = \left(\frac{100}{2(\text{Feeder\_Step\_Rate})}\right)\left(\frac{1}{V1}\right)(V1^2 - V0^2)$$

Thus, X1 equals the distance traveled while accelerating from V0 to V1 and is referred to as the ramp distance. The distance required to accelerate from the feeder speed to the carrier speed plus the distance required to decelerate back to the feeder speed cannot exceed the total length of the blank 50. Thus, $$\text{blank length} > 2(X1)$$

If the above condition is not met, controller 40 will calculate the lowest acceptable feeder velocity based on:

$$V0 = \sqrt{V1^2 - \frac{2(V1)(X1)(\text{Feeder\_Step\_Rate})}{100}}$$

Figure 7:
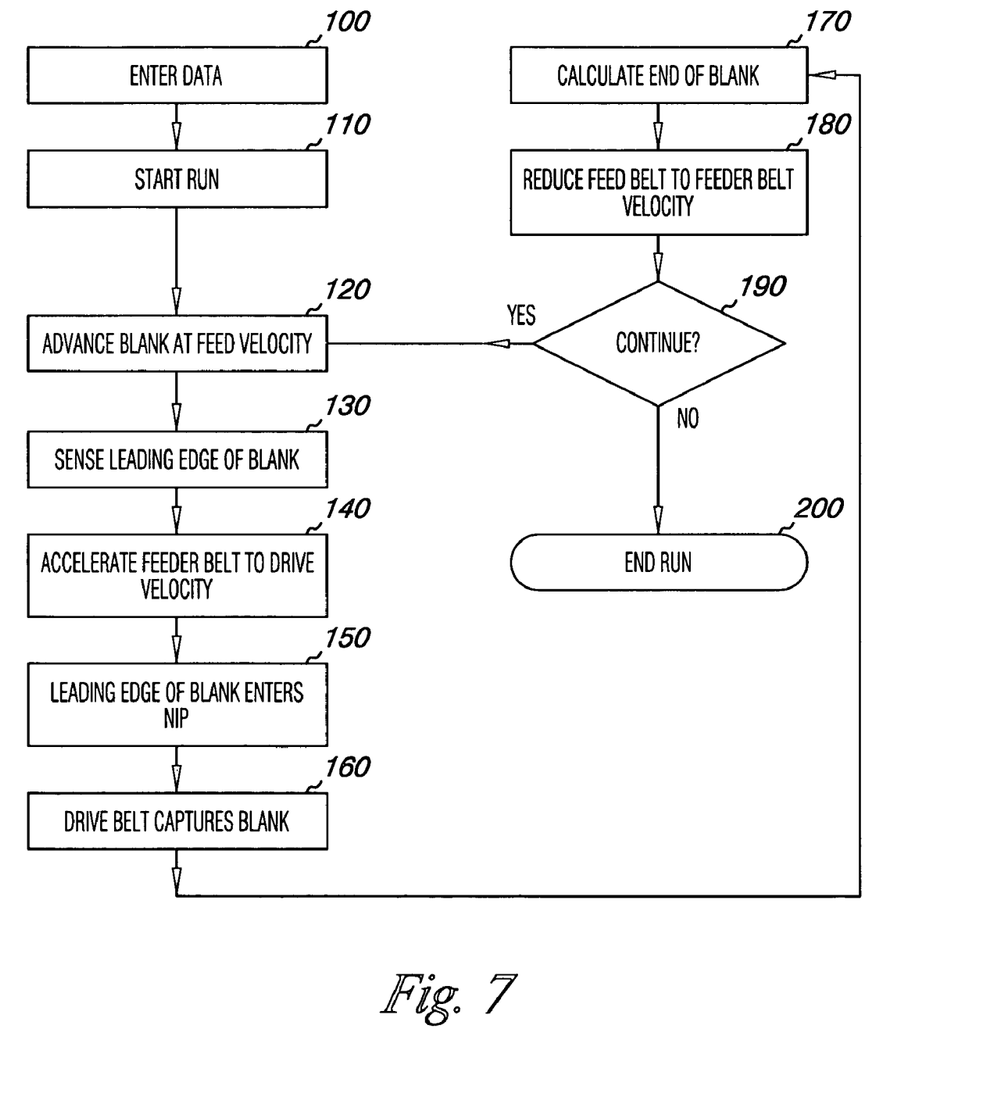
FIG. 7 is a flowchart indicating one method of generating space between consecutive blanks, consistent with the present invention.

FIG. 7 is a flowchart setting out the process of feeding a blank 50 from the feeder belt 26 to the carrier infeed belt 30. Initially, an operator enters (100) the appropriate parameters into the input screen 60 FIG. 5. The parameters include the blank length, the feeder belt speed and the carrier belt speed. From this, the controller 40 calculates the appropriate time interval between triggering acceleration and triggering deceleration.

The run is initiated (110) and blanks 50 are fed from the feeder module 12 in an end-to-end relationship to the feeder belt 26. The blanks 50 are moved (120) at the feeder velocity until the leading edge of the blank 50 is sensed (130) by the photodetector 44. The feeder belt 26 is accelerated (140) to the carrier velocity and the leading edge of the blank is passed (150) into the nip point, traveling at the carrier velocity. The carrier belt 30 captures (160) the blank 50. After the predetermined period of time calculated (170) by the controller, the feeder belt 26 is decelerated (180) back to the feeder velocity. As this occurs, a gap forms and increases between the blank which has been transferred to the carrier belt and the immediately adjacent trailing blank. If the production run is to continue (190), the process is repeated as a subsequent blank moves at the feeder velocity (120) until the leading edge triggers (130) the photodetector 44 and the process recycles. When the final blank has been processed or another end of run condition has been met, the production run ceases (200).

In the preferred embodiment as shown, the photodetector 44 is positioned so that it detects the leading edge of the desired blank and so that acceleration of the feeder belt 26 is appropriate at that point. If desired, however, acceleration can be initiated a predetermined period of time after the photodetector 44 senses the leading edge. Further, the function of the photodetector 44 or other detecting means is to identify or detect the exact position of a given blank (preferably the leading blank which continually changes as blanks are transferred) at a particular point in time. Then, knowing the speed of the feeder conveyor, the speed of the line conveyor and the length of the blank, the time when initiation of the acceleration step occurs and the time period during which the accelerated speed is maintained can be calculated. In the preferred embodiment, the photodetector 44 is positioned to detect the leading edge of a given blank and for the acceleration step to commence immediately upon such detection. This does not, however, necessarily need to be the case. Further, although the detecting means in the preferred embodiment is the photodetector 44, the invention may utilize other detecting means as well, provided they are able to detect the exact position of a particular blank at a particular point in time.

In the preferred embodiment, the sequence of the feeding operation is as follows:

1. The machine operator enters the blank length, the carrier section belt speed, and the feeder section belt speed. If the difference between the two belt speeds is too great for the feeder to accelerate/decelerate within the given box length, the operator is prompted to increase the feeder speed to a calculated feeder speed which the feeder's acceleration can achieve within the given box length.

2. The bottom blank will be driven forward by the belts contacting the blank. The feed gates are adjustable and will be set up by the machine operator so that only one blank length is allowed to feed at a time.

3. A photoelectric sensor between the feed gates and nip point will detect the leading edge of the blank and initiate the acceleration cycle.

4. The feeder section belts accelerate immediately to match the carrier section belt speed and, as the blank moves forward, vacuum through each feeder belt holds the blank in position on the belts, thus limiting skew.

5. The blank is driven into the nip at the carrier section belt speed and captured for processing through the folder gluer belt sections.

6. The machine's process controller, a closed-loop motor/control system, then determines when the trailing edge of the blank is approximately 2 inches (or some other distance) from the photoelectric sensor. At this point, the deceleration cycle will begin, causing the feeder belts to decelerate to the preset feeder speed. The transferred blank, now captured by the carrier section belts, continues at the carrier section belt speed. The difference in speed between the two sections creates a gap between the currently transferred blank and the following blank.

Although the present invention has been described with reference to preferred embodiments, persons skilled in the art will recognize that changes may be made in form and detail without departing from the spirit and scope of the invention. Accordingly, it is intended that the scope of the present invention be dictated by the appended claims rather than by the description of the preferred embodiment.

I claim:

1. A method of delivering blanks to a module, the method comprising:
   providing a first conveyor capable of travel at a first velocity and a second velocity and capable of acceleration from said first velocity to said second velocity and deceleration from said second velocity to said first velocity;
   sequentially dispensing a plurality of blanks onto said first conveyor;
   detecting the position of one of said plurality of blanks;
   accelerating the first conveyor, with said plurality of blanks thereon, in response to said detecting step to substantially match the velocity of a second conveyor when said one blank is at a preselected position on the first conveyor, said second conveyor traveling at said second velocity;
   transferring at least a portion of said one blank from the first conveyor to the second conveyor when said first conveyor is traveling at said second velocity; and
   reducing the velocity of the first conveyor, with said plurality of blanks thereon, to the first velocity after a predetermined period of time in response to said detecting step.

2. The method of claim 1, wherein the blanks are dispensed onto the first conveyor in an end-to-end relationship.

3. The method of claim 1, including repeating, detecting accelerating, transferring and reducing steps for the blank immediately adjacent to said one blank.

4. The method of claim 1, wherein said detecting step includes detecting the leading edge of said one blank.

5. The method of claim 1, including maintaining said first conveyor substantially at said second velocity between said accelerating and reducing steps.

6. The method of claim 1 wherein said detecting step includes detecting by a photodetector.

7. The method of claim 1, wherein said second conveyor includes an upper belt, a lower belt and a nip point at the entry between said upper and lower belts and wherein transferring the blank includes passing the blank into said nip point, whereby the second conveyor maintains control of the blank after the first conveyor is reduced in velocity.

8. A method of transferring blanks in a conveyance mechanism, the method comprising:
   dispensing a plurality of blanks from a feeder into a first conveyor, the blanks being dispensed into the first conveyor adjacent to one another in the direction of the travel of said first conveyor;
   advancing the plurality of blanks by said first conveyor toward a second conveyor at a first velocity, said second conveyor traveling at a second velocity and said second velocity being greater than said first velocity;
   detecting the position of a given blank of said plurality of blanks in said first conveyor as said given blank approaches said second conveyor;
   accelerating the first conveyor from the first velocity to substantially match the second velocity in response to detecting the position of said given blank;
   transferring said given blank from the first conveyor to the second conveyor after said accelerating step;
   decelerating the first conveyor to the first velocity after said accelerating step and in response to detecting the position of said given blank so that said given blank and a subsequent blank in said first conveyor immediately adjacent to said given blank travel at different velocities after said transferring step; and
   repeating said detecting, accelerating, transferring and decelerating steps for each said subsequent blank.

9. The method of claim 8, wherein decelerating the first conveyor occurs when a predetermined period of time has elapsed after said accelerating step.

10. The method of claim 9, including calculating the predetermined period of time with a controller.

11. The method of claim 10, wherein the calculating step is based on a length of said given blank, the first velocity and the second velocity.

12. The method of claim 10, further comprising:
   entering a blank length into the controller;
   entering the first velocity into the controller; and
   entering the second velocity into the controller, wherein the controller utilizes the blank length, the first velocity and the second velocity to calculate the predetermined period of time.

13. The method of claim 8 wherein said second conveyor includes upper and lower belt members and a nip and the transferring step occurs by conveying said given blank into said nip.

14. A method of transferring blanks in a conveyance mechanism, the method comprising:
   entering a blank length into the controller;
   entering a first velocity into the controller; and
   entering a second velocity into the controller, wherein the controller utilizes the blank length, the first velocity and the second velocity to calculate a predetermined period of time;
   dispensing a plurality of blanks from a feeder into a first conveyor, the blanks being dispensed into the first conveyor adjacent to one another in the direction of the travel of said first conveyor,
   advancing the plurality of blanks by said first conveyor toward a second conveyor at a first velocity, said second conveyor traveling at a second velocity and said second velocity being greater than said first velocity;

detecting the position of a given blank of said plurality of blanks in said first conveyor as said given blank approaches said second conveyor;

accelerating the first conveyor from the first velocity to substantially match the second velocity in response to detecting the position of said given blank;

transferring said given blank from the first conveyor to the second conveyor after said accelerating step;

decelerating the first conveyor to the first velocity after said accelerating step and in response to detecting the position of said given blank so that said given blank and a subsequent blank in said first conveyor immediately adjacent to said given blank travel at different velocities after said transferring step; wherein the method includes calculating the predetermined period of time with a controller based on the length of said given blank, the first velocity and the second velocity and wherein decelerating the first conveyor occurs when a predetermined period of time has elapsed after said accelerating step, wherein decelerating the first conveyor occurs when a predetermined period of time has elapsed after said accelerating step and wherein the controller automatically reduces the first velocity if the controller determines that the first conveyor is incapable of accelerating and decelerating within one blank length.

* * * * *